(12) United States Patent
Wang et al.

(10) Patent No.: US 11,143,576 B2
(45) Date of Patent: Oct. 12, 2021

(54) SUSPENSION ALIGNING MACHINE

(71) Applicant: PUTON TECHNOLOGY INC., New Taipei (TW)

(72) Inventors: An-Sung Wang, New Taipei (TW); Wen-Tan Wang, New Taipei (TW); Chia-Jun Yu, New Taipei (TW); Ching-Chang Wong, New Taipei (TW)

(73) Assignee: PUTON TECHNOLOGY INC., New Taipei (TW)

( * ) Notice: Subject to any disclaimer, the term of this patent is extended or adjusted under 35 U.S.C. 154(b) by 69 days.

(21) Appl. No.: 16/848,852

(22) Filed: Apr. 15, 2020

(65) Prior Publication Data

US 2020/0333216 A1 Oct. 22, 2020

(30) Foreign Application Priority Data

Apr. 17, 2019 (TW) .................................. 108204691

(51) Int. Cl.
*G01M 17/04* (2006.01)
(52) U.S. Cl.
CPC ................................... *G01M 17/04* (2013.01)
(58) Field of Classification Search
CPC .............................. G01M 17/04; G01M 17/06

USPC ...................................................... 73/117.03
See application file for complete search history.

(56) References Cited

U.S. PATENT DOCUMENTS

| 5,767,767 A | * | 6/1998 | Lima ..................... | B60R 16/037 33/203 |
|---|---|---|---|---|
| 2008/0073138 A1 | * | 3/2008 | Asogawa ............. | B62D 5/0418 180/209 |
| 2015/0346237 A1 | * | 12/2015 | Tule ................... | G01R 31/2889 324/750.25 |

\* cited by examiner

*Primary Examiner* — Eric S. McCall
(74) *Attorney, Agent, or Firm* — Leong C. Lei

(57) ABSTRACT

A suspension aligning machine includes a bottom board, an intermediate board, a top board, actuation modules, a jig, and a control device. The intermediate board is mounted on a top of the bottom board by first supporting elements and has through holes. The top board is arranged above the intermediate board with supporting elements provided therebetween to have the top board floating and suspending above the intermediate board. The actuation modules are mounted under the top board and respectively extend through the through holes of the intermediate board and form a gap with respect to the bottom board. The operation of the actuation modules causes the top board to vibrate and incline and workpieces deposited in the jig mounted on the top board are caused to move in the jig and fall into the cavities of the jig to line up with each other and thus orderly arranged.

9 Claims, 3 Drawing Sheets

SUSPENSION ALIGNING MACHINE

TECHNICAL FIELD OF THE INVENTION

The present invention relates generally to a suspension aligning machine, and more particularly to a suspension aligning machine that includes an actuation module operable to vibrate and incline a jig so as to have workpieces sliding into cavities of the jig to achieve regular and orderly alignment.

DESCRIPTION OF THE PRIOR ART

Industry is continuously blooming in the modern era. All sorts of parts are increasingly reduced in size so that manufacturers must use aligning machines to align and arrange such small parts for loading and unloading. A known aligning machine includes a motor that drives a linkage for causing vibration of a table, and such a structure involves a large number of parts, leading to a high rate of damage and malfunctioning. Adjusting vibration parameters of the known aligning machine may need operations of substitute and adjustment of weights, making the operation of adjusting complicated and tedious.

SUMMARY OF THE INVENTION

The primary objective of the present invention is to provide an aligning machine having a simple structure.

To achieve the above objective, the present invention provides a suspension aligning machine that comprises a bottom board, an intermediate board, a top board, a plurality of actuation modules, a jig, and a control device. The intermediate board is mounted on a top of the bottom board by a plurality of first supporting elements and is formed with a plurality of the through holes. The top board is arranged above the intermediate board. A plurality of supporting elements are provided between the top board and the intermediate board to have the top board floating and suspending above the intermediate board. The actuation modules are mounted under the top board. The actuation modules respectively extend through the through holes of the intermediate board and form a gap with respect to the bottom board. The operation of the plurality of actuation modules causes the top board to vibrate and incline. The jig is mounted on the top board. Workpieces that are deposited in the jig are caused to move in the jig due to the actuation modules vibrating and inclining the jig such that the workpieces so moved around fall into the cavities of the jig to line up with each other and thus orderly arranged. The control device is operable to adjust amplitude and frequency of the inclining operation for different types of workpieces.

DETAILED DESCRIPTION OF THE PREFERRED EMBODIMENT

Figure 1:
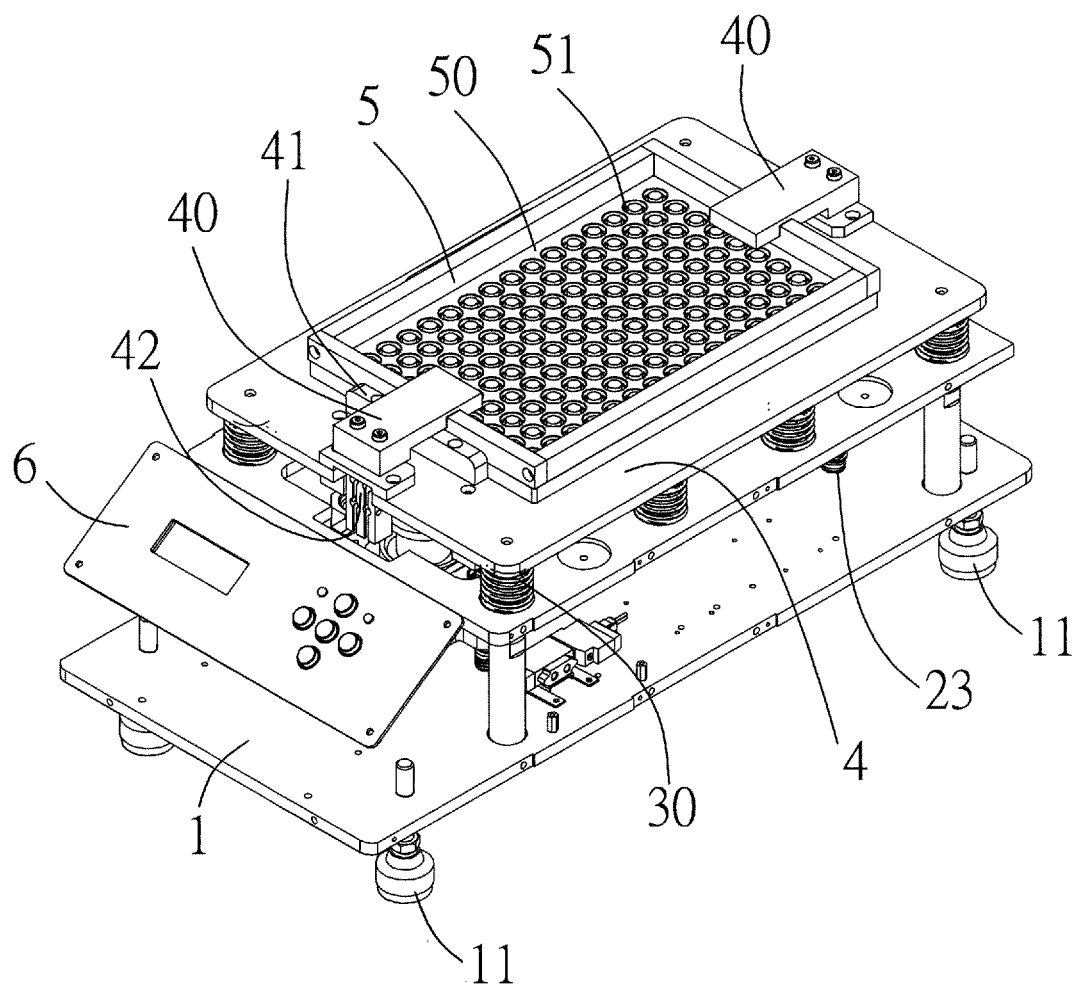
FIG. 1 is a perspective view showing an embodiment of the present invention.
Figure 2:
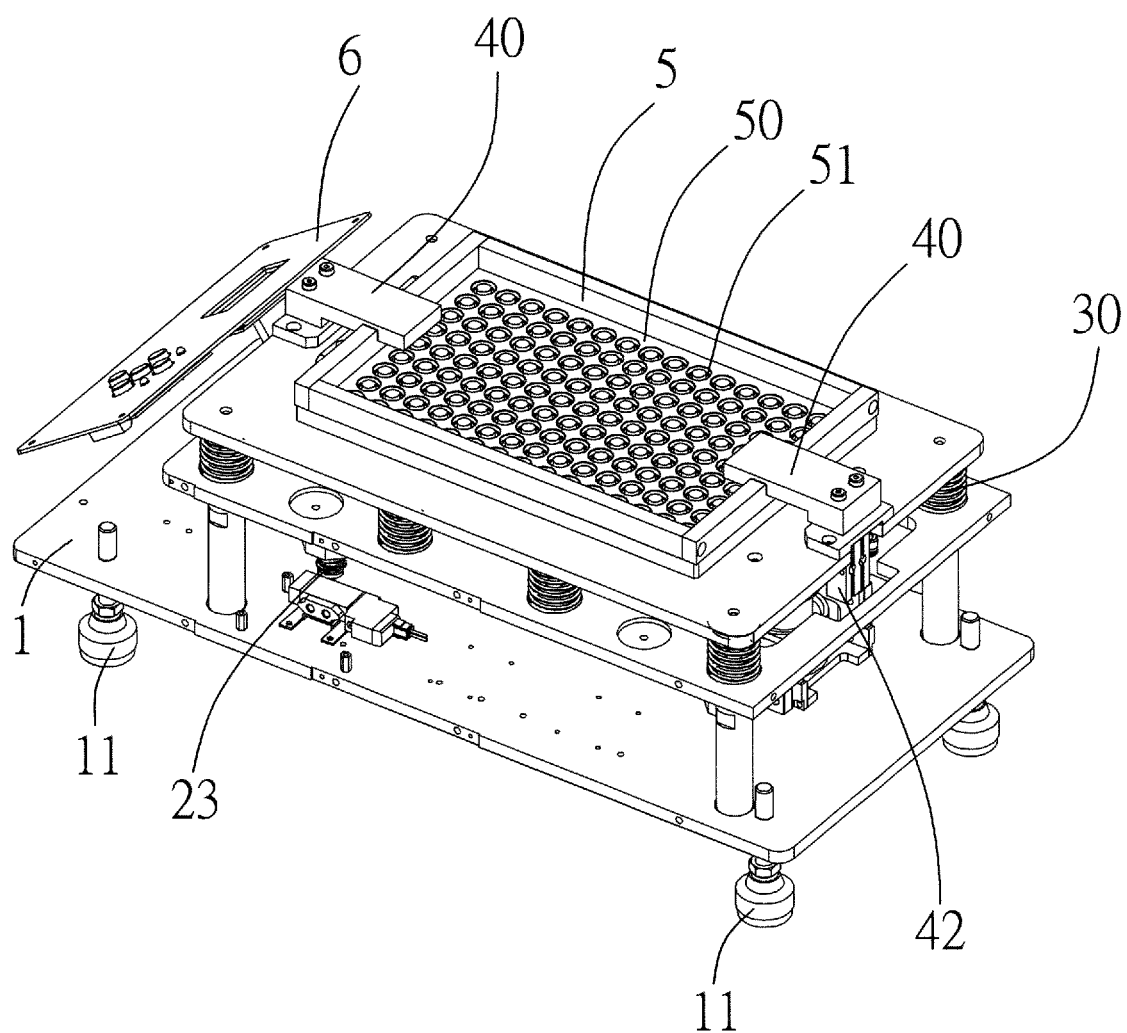
FIG. 2 is also a perspective view taken from a perspective different from FIG. 1.
Figure 3:
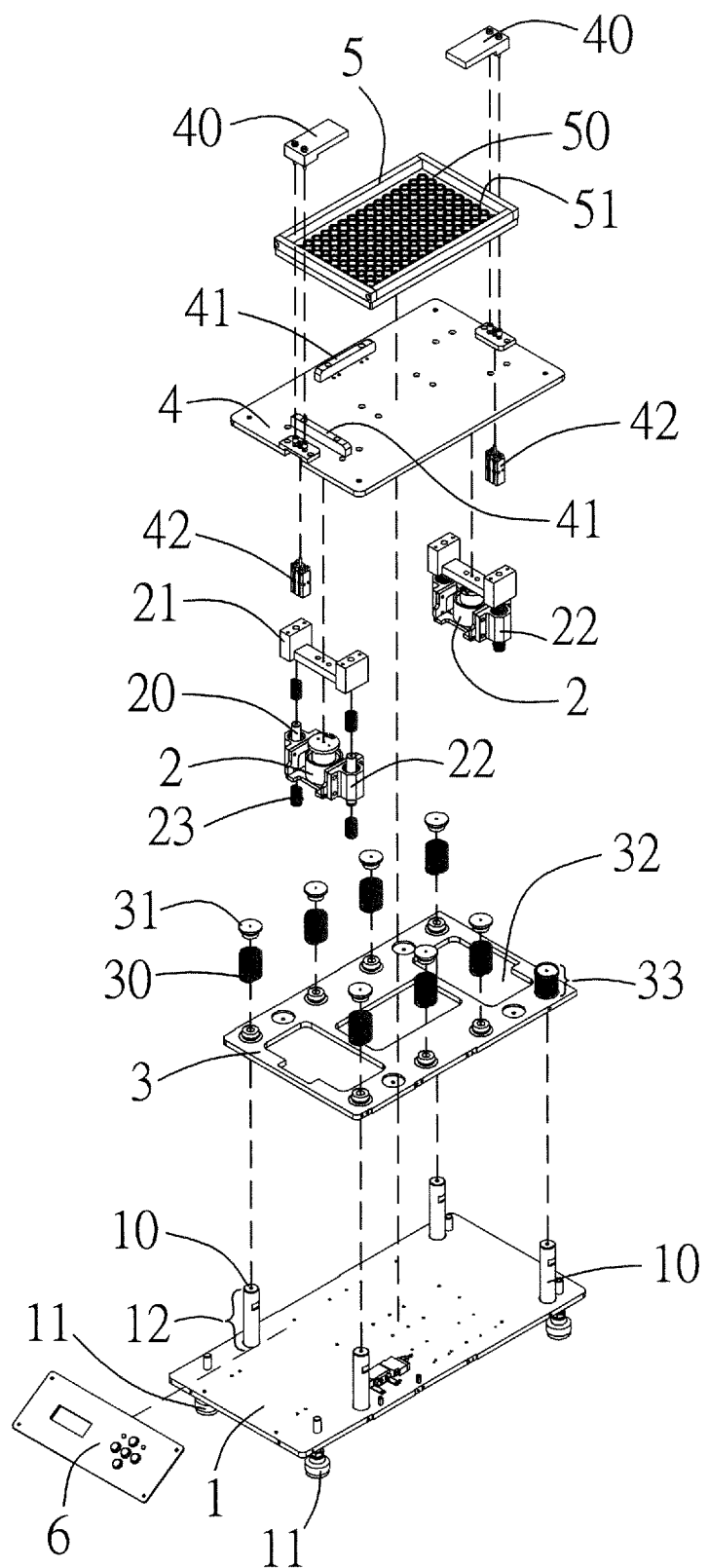
FIG. 3 is an exploded view of FIG. 1.

Referring to FIGS. 1-3, which illustrate an embodiment of the present invention, the present invention provides a suspension aligning machine, which comprises a bottom board 1; an intermediate board 3, which is mounted on a top of the bottom board 1 by a plurality of first supporting elements 10, each of the first supporting elements 10 making the inter mediate board 3 and the bottom board 1 spaced from each other by a first distance 12, the intermediate board 3 being provided with a plurality of through holes 32; and a top board 4, which is supported on and mounted to a top of the intermediate board 3 by a plurality of second supporting elements 30, each of the second supporting elements 30 making the top board 4 and the intermediate board spaced from each other by a second distance 33, each of the second supporting elements 30 including an elastic material.

The second supporting elements 30 are each made in the form of a spring that is fit to, at a location corresponding to each of an upper end and a lower end thereof, a second elastic element 31. Each of the second elastic elements 31 provided on the upper end of each of the second supporting elements 30 is coupled to the top board 4, and each of the second elastic elements 31 provided on the lower end of each of the second supporting elements 30 is coupled to the intermediate board 3.

Each of the second supporting elements 30 can be made as a magnetic element. Each of the second supporting elements 30 is mounted, in a manner of being opposite to each other, under the top board 4 and above the intermediate board 3 and each comprises a position constrainer (not shown) arranged between each other. A magnetic pole of each of the second supporting elements 30 that is arranged under the top board 4 is magnetically repulsive to a magnetic pole of each of the second supporting elements 30 that is arranged on the intermediate board 3, so as to make the top board 4 and the intermediate board 3 spaced from each other by the second distance 33. Each of the position constrainers (not shown) is provided for preventing each of the second supporting elements 30 that is mounted on the top board 4 and each of the second supporting elements 30 that is mounted on the intermediate board 3 from shifting in position from each to loss the effect of magnetic repulsion between the magnetic poles thereof.

A plurality of actuation modules are mounted under the top board 4. The actuation modules each comprise an actuator 2, a guide-rod frame 22, a plurality of guide rods 20, a plurality of first elastic elements 23, and a connection member 21. The actuator 2 is mounted on the guide-rod frame 22, and the actuator 2 has an operation direction that is perpendicular to the top board 4. The guide-rod frame 22 is formed with two guide-rod holes, and the guide-rod holes are arranged symmetric relative to each other with the actuator 2 being a center of symmetry and have an axial direction that is parallel to the operation direction of the actuator 2. The guide rods 20 respectively penetrate through the guide-rod holes, such that upper and lower ends of each of the guide rods 20 protrude out of each of the guide-rod holes. The first elastic elements 23 are respectively fit over the upper and lower ends of each of the guide rods 20. An upper end of the actuators 2 and the upper end of each of the guide rods 20 are coupled to a lower end of the connection member 21. An upper end of the connection member 21 is coupled to a surface of the top board 4 that faces downward. The actuation modules penetrate through the through holes 32, respectively, and form a gap with respect to the bottom board 1. The guide-rod frames 22, the guide rods 20, and the first elastic elements 23 support the actuators 2.

A jig 5 is formed with an accommodation space 50 for receiving a plurality of workpieces (not shown) to deposit therein. The jig 5 is mounted, by means of at least one fixing element 40, on a surface of the top board 4 that faces upwards. The accommodation space 50 has a bottom surface that is formed with a plurality of cavities 51 to respectively receive the workpieces (not shown) to slide thereinto. The cavities 51 are arranged, through precise calculation and machining, to orderly arrange the workpieces (not shown). The top board 4 is provided with at least one positioning piece 41 mounted thereon for efficiently and easily align and position the jig 5 at a desired location on the top board 4. The fixing element 40 can be directly mounted to the jig 5, or the fixing element 40 can be coupled to a force application member 42 for controlling opening and closing of the fixing element 40. The force application member 42 can be a pneumatic cylinder or a hydraulic cylinder.

A control device 6 is electrically connected with each of the actuators 2. The control device 6 controls each of the actuators 2 in respect of operation frequency and amplitude. The actuators 2 are operable to cause the top board 4 and the jig 5 to repeatedly vibrate and incline toward each direction so as to have each of the workpieces (not shown) moving in the jig 5 to slide into a respective one of the cavities 51 of the jig 5, whereby the workpieces (not shown) are arranged, in an ordered manner, the cavities 51 and lined up. The control device 6 is operable through electric control to set up parameters of the actuators 2 in respect of different kinds of workpieces (not shown) for controlling the amplitude of the actuators 2 as desired. This is opposite to the existing motor-operated aligning machines that require a complicated and tedious process of replacing physical parts, such as weights, in order to fulfill an operation of adjusting vibration parameters. The control device 6 may be further arranged to store each set of parameters or to include a remote control module (not shown), such as WIFI, Bluetooth, and infrared, to allow a user to perform remote control.

We claim:

1. A suspension aligning machine, comprising:
   a bottom board;
   an intermediate board, which is mounted on a top of the bottom board by a plurality of first supporting elements, the first supporting elements spacing the intermediate board and the bottom board from each other by a first distance, the intermediate board being forming with a plurality of through holes;
   a top board, which is supported on and mounted to a top of the intermediate board by a plurality of second supporting elements, the second supporting elements spacing the top board and the intermediate board from each other by a second distance;
   a plurality of actuation modules, which are coupled under the top board, each of the actuation modules comprising an actuator, a guide-rod frame, a plurality of guide rods, a plurality of first elastic elements, and a connection member, wherein the actuator is mounted on the guide-rod frame and the actuator has an operation direction that is perpendicular to the top board; the guide-rod frame is formed with two guide-rod holes, and the guide-rod holes are arranged symmetric with respect to each other with the actuator being a symmetry center and have an axial direction that is parallel to the operation direction of the actuator; the guide rods are arranged in and penetrating through the guide-rod holes, respectively, and each of the guide rods has upper and lower ends protruding outside a respective one of the guide-rod holes; the first elastic elements are respectively fit to the upper and lower ends of each of the guide rods; and an upper end of the actuator and the upper end of each of the guide rods are coupled to a lower end of the connection member and an upper end of the connection member is coupled to a surface of the top board that faces downwards; and wherein the actuation modules respectively extend through the through holes and form a gap with respect to the bottom board;
   a jig, which has an accommodation space for receiving a plurality of workpieces to deposit therein, the jig comprising at least one fixing element mounted to a surface of the top board that faces upwards, the accommodation space having a bottom surface that is formed with a plurality of cavities for receiving the workpieces to slide thereinto respectively; and
   a control device, which is electrically connected to each of the actuators, the control device controlling a frequency of operation of each of the actuators to cause the top board and the jig to repeatedly vibration and incline so as to have each of the workpieces slide into a respective one of the cavities of the jig.

2. The suspension aligning machine according to claim 1, wherein each of the second supporting elements has elasticity.

3. The suspension aligning machine according to claim 2, wherein each of the second supporting elements is provided, at location of each of an upper end and a lower end thereof, with a second elastic element, each of the second elastic elements that is mounted to the upper end of each of the second supporting elements being coupled to the top board, each of the second elastic elements that is mounted to the lower end of each of the second supporting elements being coupled to the intermediate board.

4. The suspension aligning machine according to claim 1, wherein each of the second supporting elements comprises a magnetic element, each of the second supporting elements being mounted under the top board and above the intermediate board in a manner of being spaced from each other and each including a position constrainer arranged therebetween, each of the second supporting elements mounted under the top board having a magnetic pole that is magnetically repulsive to a magnetic pole of each of the second supporting elements mounted on the intermediate board, so that the top board and the inter mediate board are spaced from each other by the second distance.

5. The suspension aligning machine according to claim 1, wherein the fixing element is coupled to a force application member, and the fixing element is driven by the force application member to selectively open and close.

6. The suspension aligning machine according to claim 5, wherein the force application member comprises a pneumatic cylinder.

7. The suspension aligning machine according to claim 5, wherein the force application member comprises a hydraulic cylinder.

8. The suspension aligning machine according to claim 1, wherein the control device comprises a remote control module.

9. The suspension aligning machine according to claim 8, wherein the remote control module is one of a WIFI communication module, a Bluetooth communication module, and an infrared communication module.

* * * * *